United States Patent
Choi et al.

(10) Patent No.: US 7,619,875 B2
(45) Date of Patent: Nov. 17, 2009

(54) SOLID ELECTROLYTIC CAPACITOR AND METHOD OF MANUFACTURING THE SAME

(75) Inventors: Hee Sung Choi, Gyeonggi-do (KR); Seoung Jae Lee, Gyeonggi-do (KR); Yeoung Jin Lee, Gyeonggi-do (KR); Sung Han Won, Seoul (KR); Ha Yong Jung, Gyeonggi-do (KR); Hyun Ho Shin, Gyeonggi-do (KR); Jung Tae Park, Seoul (KR); Jae Youn Jeong, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 124 days.

(21) Appl. No.: 12/007,191

(22) Filed: Jan. 8, 2008

(65) Prior Publication Data

US 2009/0154066 A1    Jun. 18, 2009

(30) Foreign Application Priority Data

Dec. 17, 2007    (KR) ........................ 10-2007-0132564

(51) Int. Cl.
*H01G 4/228* (2006.01)
*H01G 9/00* (2006.01)

(52) U.S. Cl. ........................ 361/540; 361/538; 361/533; 361/531; 29/25.03

(58) Field of Classification Search ................. 361/540, 361/538, 533, 531; 29/25.03
See application file for complete search history.

(56) References Cited

U.S. PATENT DOCUMENTS 5,390,074 A * 2/1995 Hasegawa et al. ........... 361/540
5,469,324 A * 11/1995 Henderson et al. ......... 361/301.2
7,108,729 B2 * 9/2006 Kanetake .................... 29/25.03
7,450,366 B2 * 11/2008 Kuriyama .................... 361/523

FOREIGN PATENT DOCUMENTS

JP          05090088 A  *  4/1993
JP          2002-25860      1/2002
JP          2004-14639      1/2004

* cited by examiner

*Primary Examiner*—Eric Thomas
(74) *Attorney, Agent, or Firm*—McDermott Will & Emery LLP

(57) ABSTRACT

Provided is a solid electrolytic capacitor including a capacitor element with a positive polarity; an anode wire inserted and connected to a lower portion of the capacitor element; a cathode extraction layer formed on the capacitor element; an anode lead frame provided on one side of the lower surface of the capacitor element so as to be electrically insulated from the cathode extraction layer, the anode lead frame having an insertion portion into which a projecting lower portion of the anode wire is inserted; a cathode lead frame provided on the other side of the lower surface of the capacitor element so as to be electrically connected to the cathode extraction layer; a molding portion formed to surround the capacitor element and exposing the lower end surface of the anode wire, the lower surface of the anode lead frame, and the lower surface of the cathode lead frame; an anode lead terminal provided on the molding portion so as to be electrically connected to the lower end surface of the anode wire and the lower surface of the anode lead frame; and a cathode lead terminal provided on the molding portion so as to be electrically connected to the lower surface of the cathode lead frame.

21 Claims, 7 Drawing Sheets

SOLID ELECTROLYTIC CAPACITOR AND METHOD OF MANUFACTURING THE SAME

CROSS-REFERENCE TO RELATED APPLICATIONS

This application claims the benefit of Korean Patent Application No. 10-2007-0132564 filed with the Korea Intellectual Property Office on Dec. 17, 2007, the disclosure of which is incorporated herein by reference.

BACKGROUND OF THE INVENTION

1. Field of the Invention

The present invention relates to a solid electrolytic capacitor and a method of manufacturing the same.

2. Description of the Related Art

In general, solid electrolytic capacitors having a function of storing electricity are electronic components used for blocking direct currents and passing alternating currents. Among the solid electrolytic capacitors, the most representative one is a tantalum capacitor which is used in application circuits, of which the rate voltage range is low, as well as general industrial equipments. In particular, the tantalum capacitor is frequently used in circuits requiring an excellent frequency characteristic or for reducing noise of communication equipments.

FIG. 1 is a perspective view of a conventional solid electrolytic capacitor, and FIG. 2 is a cross-sectional view of the conventional solid electrolytic capacitor. As shown in FIGS. 1 and 2, the solid electrolytic capacitor 10 includes a capacitor element 11 which determines the capacity and characteristic of the capacitor and is formed of dielectric ceramic powder, anode and cathode lead frames 13 and 14 which are connected to the capacitor element 11 so as to be easily mounted on a printed circuit board (PCB), and an epoxy case 15 which is molded of epoxy so as to protect the capacitor element 11 from the external environment and to form the shape of the capacitor element.

In one side of the capacitor element 11, a rod-shaped anode wire 12 is formed to project with a predetermined length.

The anode wire 12 has a planar surface 12a provided thereon, the pressed surface 12a increasing a contact area with the anode lead frame 13 and preventing the anode lead frame 12 from rocking from side to side during welding.

The capacitor element 11 is manufactured by the following process. First, dielectric ceramic powder is molded in a rectangular parallelepiped shape in a pressing process and is then sintered. Further, a dielectric oxide film is formed on the surface of the sintered body. Then, the body is dipped into a manganese nitrate solution such that a manganese dioxide layer composed of a solid electrolyte is formed on the outer surface of the body.

A process of connecting the anode and cathode lead frames 13 and 14 to the capacitor element 11 manufactured in such a manner includes two steps. In the first step, the plate-shaped anode lead frame 13 is welded on the planar surface 12a of the rod-shaped anode wire 12, which projects from one side surface of the capacitor element 11 at a predetermined length, so as to derive an anode terminal. In the second step, a cathode terminal is derived through the surface of the capacitor element 11 or a conductive adhesive coated on the cathode lead frame 14.

Then, the capacitor element 11 is electrically connected to the anode and cathode lead frames 13 and 14, respectively, and the epoxy case 15 is molded of epoxy. Then, the solid electrolytic capacitor is completed through a subsequent assembling process.

The above-described conventional electrolytic capacitor has the following problems.

While the anode wire 12 and the anode lead frame 13 are directly welded, high-temperature heat is generated. The generated heat has an effect upon the capacitor element 11 through the anode wire 12, thereby damaging the capacitor element 11 which is vulnerable to heat.

Further, dielectrics are destroyed by the heat shock applied to the capacitor element 11 such that a product quality is degraded and defects occur. Therefore, a manufacturing cost increases.

Further, the anode lead frame 13 and the cathode lead frame 14 occupy such a large space in the epoxy case 15. Therefore, the capacitor element 11 is inevitably reduced in size within the epoxy case 15. As a result, the capacitance of the capacitor decreases.

SUMMARY OF THE INVENTION

An advantage of the present invention is that it provides a solid electrolytic capacitor and a method of manufacturing the same, which can reduce a manufacturing cost by simplifying a structure and a manufacturing process, can achieve a reduction in size, can maximize capacitance, and can implement a low ESR (Equivalent Series Resistance) characteristic.

Additional aspects and advantages of the present general inventive concept will be set forth in part in the description which follows and, in part, will be obvious from the description, or may be learned by practice of the general inventive concept.

According to an aspect of the invention, a solid electrolytic capacitor comprises a capacitor element with a positive polarity; an anode wire inserted and connected to a lower portion of the capacitor element; a cathode extraction layer formed on the capacitor element; an anode lead frame provided on one side of the lower surface of the capacitor element so as to be electrically insulated from the cathode extraction layer, the anode lead frame having an insertion portion into which a projecting lower portion of the anode wire is inserted; a cathode lead frame provided on the other side of the lower surface of the capacitor element so as to be electrically connected to the cathode extraction layer; a molding portion formed to surround the capacitor element and exposing the lower end surface of the anode wire, the lower surface of the anode lead frame, and the lower surface of the cathode lead frame; an anode lead terminal provided on the molding portion so as to be electrically connected to the lower end surface of the anode wire and the lower surface of the anode lead frame; and a cathode lead terminal provided on the molding portion so as to be electrically connected to the lower surface of the cathode lead frame.

Preferably, the anode lead frame is bonded to the capacitor element through an insulating adhesive, and the cathode lead frame is bonded to the capacitor element through a conductive adhesive.

The anode and cathode lead frames may be formed of a conductive material.

The insertion portion of the anode lead frame may be formed in a hole shape or a groove shape which is opened toward the cathode lead frame.

The cathode extraction layer may be composed of a dielectric oxide coating film, a solid-state electrolyte layer, and a cathode reinforcing layer, which are sequentially formed on the capacitor element.

The anode and cathode lead terminals may be formed of a plated layer obtained through an electroless plating method.

Preferably, the plated layer is composed of an inner plated layer obtained through electroless Ni/P plating and an outer plated layer obtained by plating the inner plated layer with copper (Cu) or tin (Sn).

The anode wire may be positioned in the center of the capacitor element.

According to another aspect of the invention, a method of manufacturing a solid electrolytic capacitor comprises the steps of: (a) forming a capacitor element with a positive polarity; (b) inserting and connecting an anode wire to a lower portion of the capacitor element; (c) forming a cathode extraction layer on the capacitor element; (d) inserting a projecting lower portion of the anode wire into an insertion portion of the anode lead frame, providing an anode lead frame on one side of the lower surface of the capacitor element so as to be electrically insulated from the cathode extraction layer, and providing a cathode lead frame on the other side of the lower surface of the capacitor element so as to be electrically connected to the cathode extraction layer; (e) forming a molding portion to surround the capacitor element; (f) exposing the lower end surface of the anode wire, the lower surface of the anode lead frame, and the lower surface of the cathode lead frame; and (g) forming an anode lead terminal, which is electrically connected to the lower end surface of the anode wire and the lower surface of the anode lead frame, and a cathode lead terminal which is electrically connected to the lower surface of the cathode lead frame.

The method may further comprise the step of cutting the projecting lower portion of the anode wire such that the lower portion of the anode wire is adjacent to the surface of the capacitor element. The cutting of the projecting lower portion is performed after step (b).

The method may further comprise the step of coating the surface of the anode wire with an insulating material. The coating of the surface is performed before the cutting of the projecting lower portion.

Preferably, the lower portion of the anode wire is cut by ultraviolet (UV) laser.

In step (c), the cathode extraction layer may be constructed by sequentially forming a dielectric oxide coating film, a solid-state electrolyte layer, and a cathode reinforcing layer on the capacitor element.

In step (d), the anode lead frame may be bonded to the capacitor element through an insulating adhesive, and the cathode lead frame may be bonded to the capacitor element through a conductive adhesive.

Preferably, when the anode or cathode lead frame is pressed against the capacitor element, a bonding position between the capacitor element and the anode or cathode lead frame is adjusted in a state where the insulating adhesive or the conductive adhesive is semi-cured by applying heat to the anode or cathode lead frame, and then the insulating adhesive or the conductive adhesive is completely cured.

In step (e), the molding portion may be formed to seal the anode wire, the anode lead frame, and the cathode lead frame. The molding portion may be formed of epoxy-based resin.

In step (f), the molding portion may be diced in such a manner that the lower end surface of the anode wire, the lower surface of the anode lead frame, and the lower surface of the cathode lead frame are exposed. The diced portion may be subjected to grinding, polishing, or sand blasting.

In step (g), the anode lead terminal may be constructed by forming a plated layer on the exposed lower end surface of the anode wire, the lower surface of the anode lead frame, and the molding portion adjacent to the anode lead frame through an electroless plating method, and the cathode lead terminal may be constructed by forming a plated layer on the lower surface of the cathode lead frame and the molding portion adjacent to the cathode lead frame through an electroless plating method.

Preferably, the plated layer is composed of an inner plated layer obtained through electroless Ni/P plating and an outer plated layer obtained by plating the inner plated layer with Cu or Sn.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
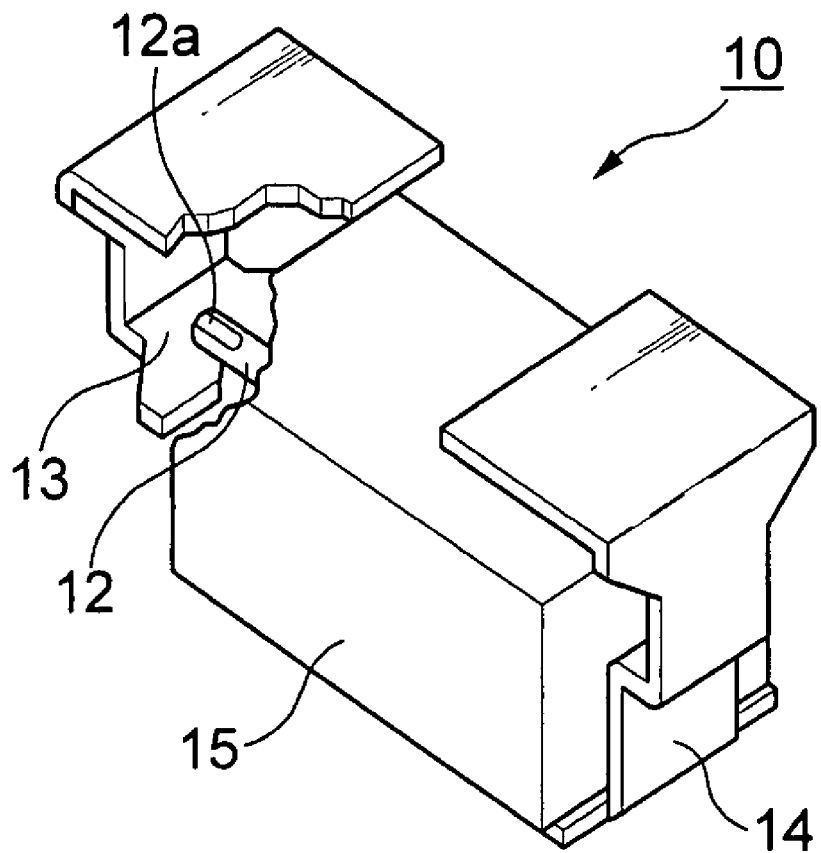
FIG. 1 is a perspective view of a conventional solid electrolytic capacitor.
Figure 2:
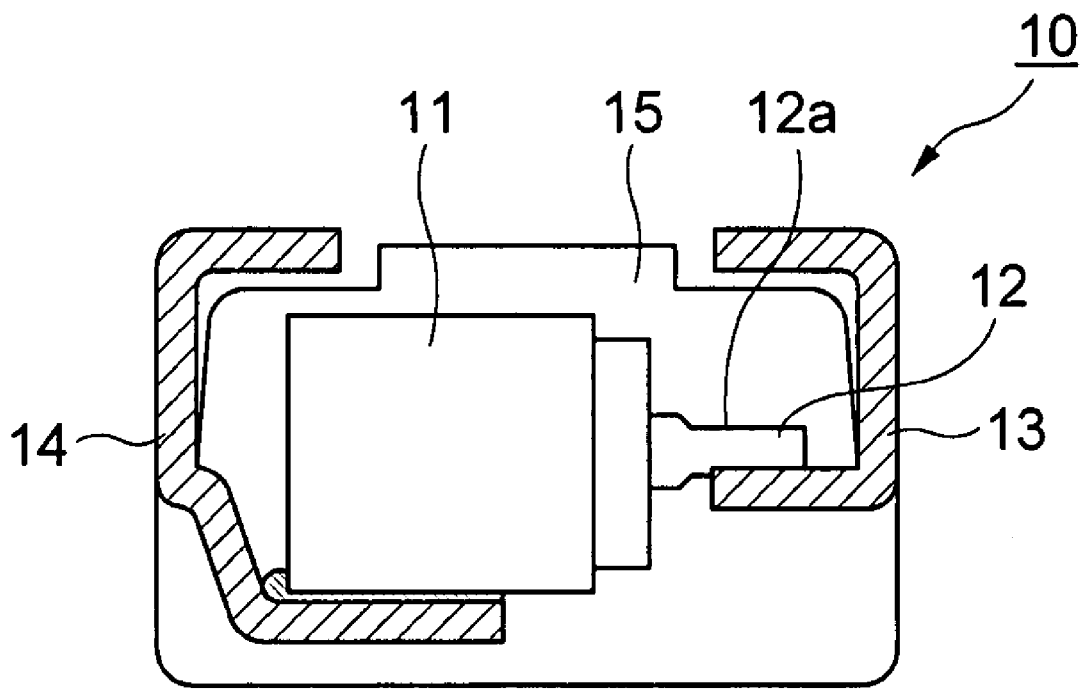
FIG. 2 is a cross-sectional view of the conventional solid electrolytic capacitor.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a solid electrolytic capacitor and a method of manufacturing the same according to the present invention will be described in detail with reference to the accompanying drawings.

First Embodiment of Solid Electrolytic Capacitor

Figure 3:
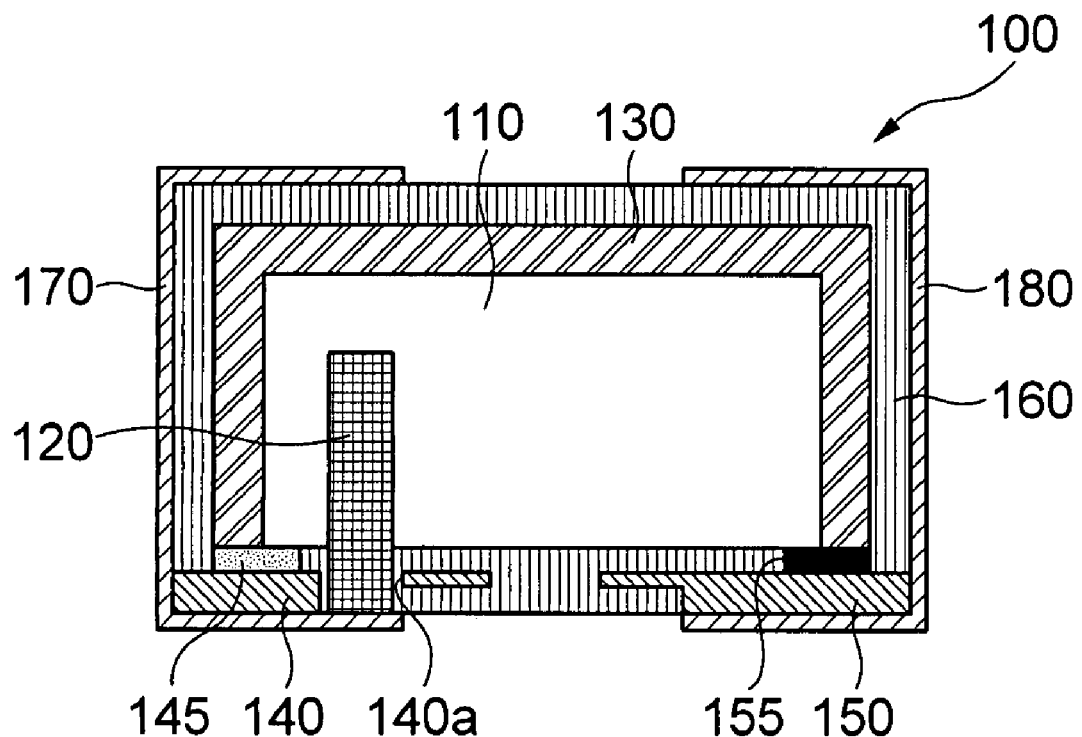
FIG. 3 is a front cross-sectional view of a solid electrolytic capacitor according to the first embodiment of the invention.

Referring to FIG. 3, a solid electrolytic capacitor according to a first embodiment of the invention will be described in detail.

FIG. 3 is a front cross-sectional view of a solid electrolytic capacitor according to the first embodiment of the invention.

As shown in FIG. 3, the solid electrolytic capacitor 100 according to the first embodiment of the invention includes a capacitor element 110 with a positive polarity; an anode wire 120 which is inserted and connected to a lower portion of the capacitor element 110; a cathode extraction layer 130 formed on the capacitor element 110; an anode lead frame 140 which is provided on one side of the lower surface of the capacitor element 110 so as to be electrically insulated from the cathode extraction layer 130 and has an insertion portion 140a into which a projecting lower portion of the anode wire 120 is inserted; a cathode lead frame 150 which is provided on the other side of the lower surface of the capacitor element 110 so as to be electrically connected to the cathode extraction layer 130; a molding portion 160 which is formed to surround the capacitor element 110 and exposes the lower end surface of the anode wire 120, the lower surface of the anode lead frame 140, and the lower surface of the cathode lead frame 150; an anode lead terminal 170 which is provided on the molding portion 160 so as to be electrically connected to the exposed lower end surface of the anode wire 120 and the lower surface of the anode lead frame 140; and a cathode lead terminal 180 which is provided on the molding portion 160 so as to be electrically connected to the lower surface of the cathode lead frame 150.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 is formed, in order to prevent the anode wire 120 and the cathode extraction layer 130 from being electrically connected to each other.

Alternately, the projecting lower surface of the anode wire 120 may be coated with an insulating material so as to be insulated from the cathode extraction layer 130.

Preferably, the anode lead frame 140 is bonded to the capacitor element 110 through an insulating adhesive 145, and the cathode lead frame 150 is bonded to the capacitor element 110 through a conductive adhesive 155.

The anode lead frame 140 and the cathode lead frame 150 may be formed of a conductive material.

The insertion portion 140a of the anode lead frame 140 may be formed in a hole shape or groove shape (refer to FIG. 12) which is opened toward the cathode lead frame 150.

The anode lead terminal 170 and the cathode lead terminal 180 may be formed of a plated layer obtained by an electroless plating method.

Preferably, the plated layer is composed of an inner plated layer obtained through electroless Ni/P plating and an outer plated layer obtained by plating the inner plated layer with copper (Cu) or tin (Sn).

Hereinafter, a method of manufacturing a solid electrolytic capacitor according to the first embodiment of the invention will be described in detail with reference to FIGS. 4 to 9.

Figure 4:
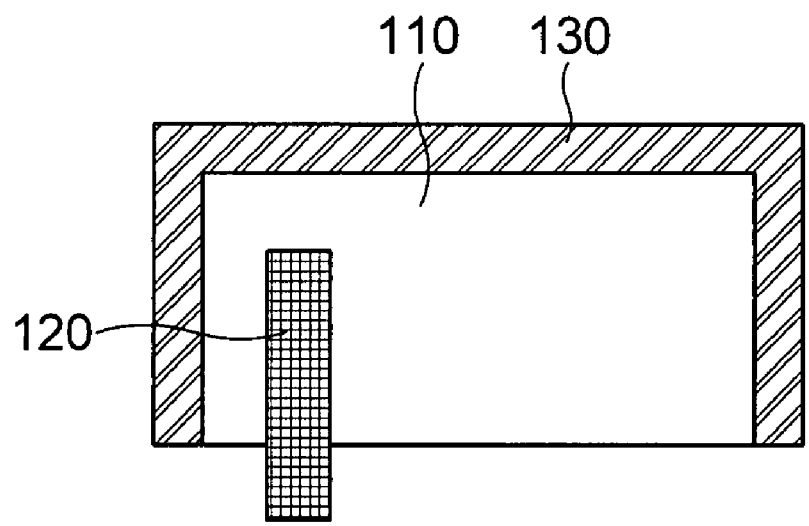
FIGS. 4 to 9 are cross-sectional views sequentially showing a method of manufacturing a solid electrolytic capacitor according to the first embodiment of the invention.
Figure 5:
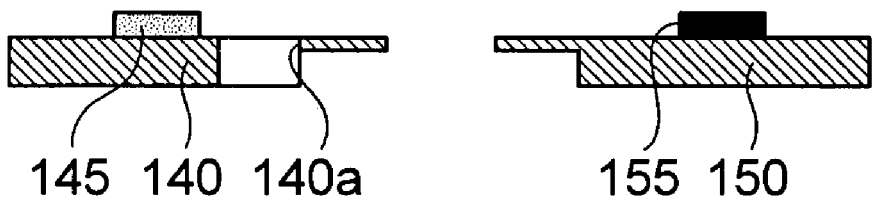
Figure 6:
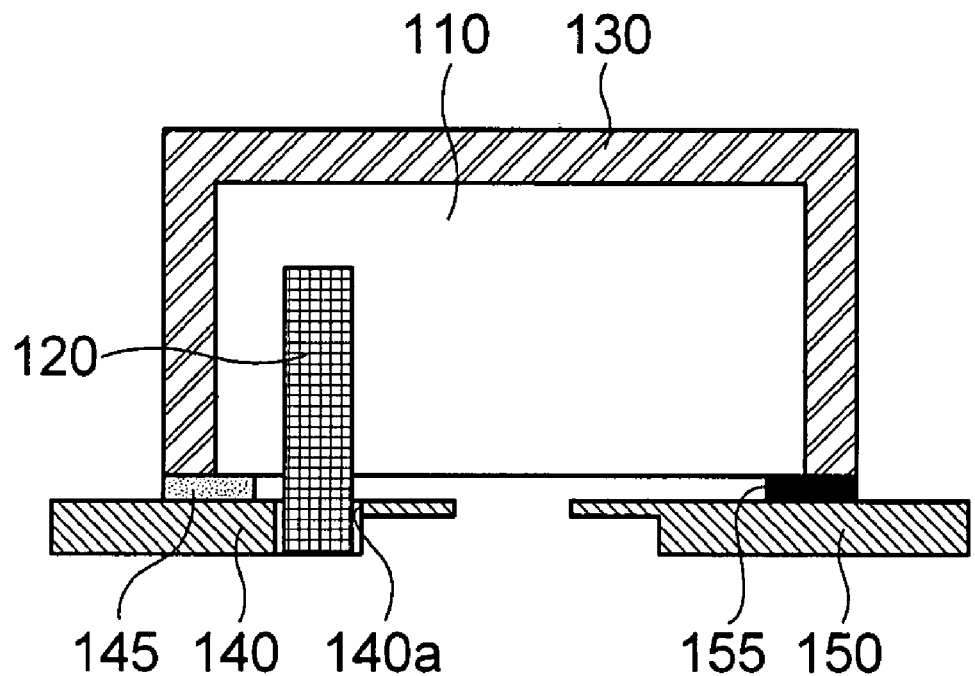
Figure 7:
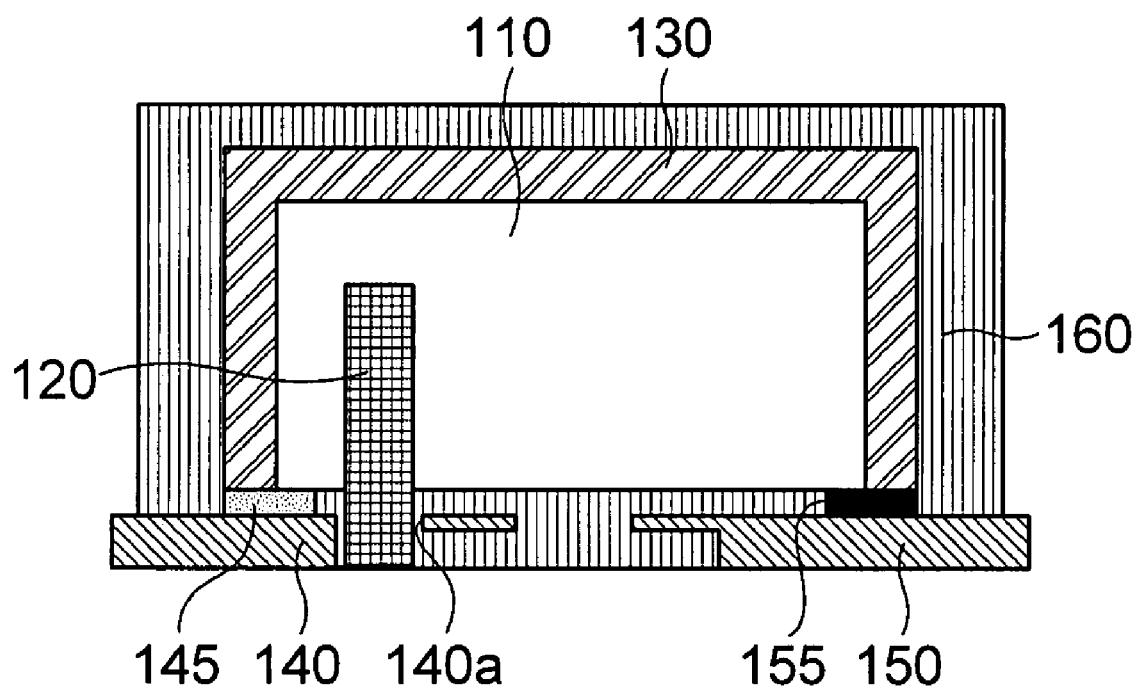
Figure 8:
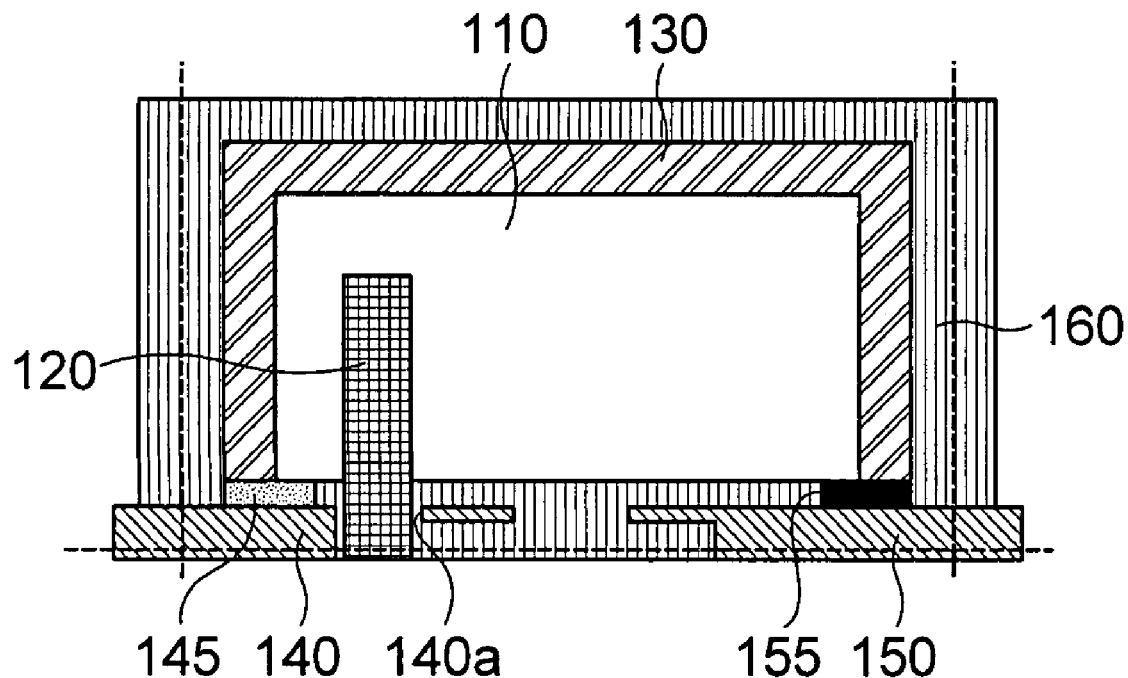
Figure 9:
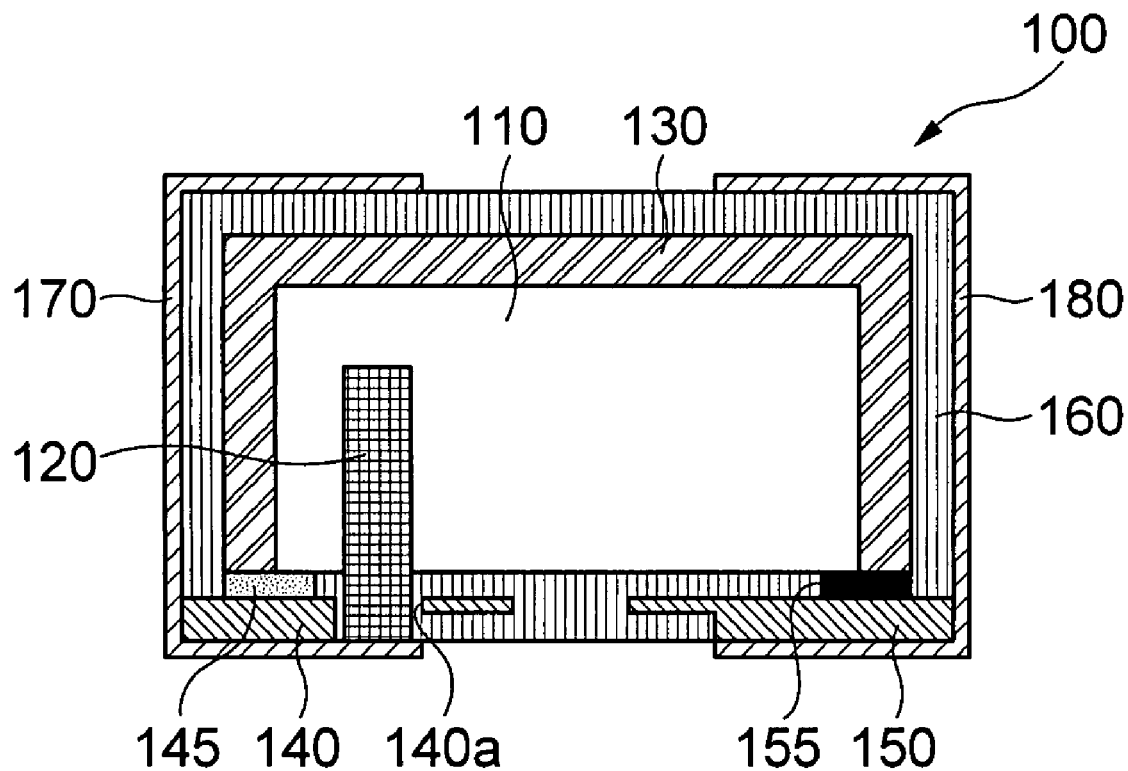

FIGS. 4 to 9 are cross-sectional views sequentially showing a method of manufacturing a solid electrolytic capacitor according to the first embodiment of the invention. FIG. 4 is a cross-sectional view of a capacitor element having an anode wire and a cathode extraction layer formed therein. FIG. 5 is a cross-sectional view of an anode lead frame having an insulating adhesive provided thereon and a cathode lead frame having a conductive adhesive provided thereon. FIG. 6 is a cross-sectional view showing a state where the capacitor element of FIG. 4 is bonded to the anode lead frame and the cathode lead frame of FIG. 5. FIG. 7 is a cross-sectional view showing a state where a molding portion is formed. FIG. 8 is a cross-sectional view showing a dicing line of the molding portion. FIG. 9 is a cross-sectional view showing a state where an anode lead terminal and a cathode lead terminal are formed.

The method of manufacturing a solid electrolytic capacitor according to the first embodiment of the invention includes the steps of: forming a capacitor element 110 with a positive polarity; inserting and connecting an anode wire 120 to a lower portion of the capacitor element 110; forming a cathode extraction layer 130 on the capacitor element 110; inserting a projecting lower portion of the anode wire 120 into an insertion portion 140a of an anode lead frame 140, providing the anode lead frame 140 on one side of the lower surface of the capacitor element 110 so as to be electrically insulated from the cathode extraction layer 130, and providing a cathode lead frame 150 on the other side of the lower surface of the capacitor element 110 so as to be electrically connected to the cathode extraction layer 130; forming a molding portion 160 to surround the capacitor element 110; exposing the lower end surface of the anode wire 120 and the lower surfaces of the anode and cathode lead frames 140 and 150; and forming an anode lead terminal 170, which is electrically connected to the lower end surface of the anode wire 120 and the lower surface of the anode lead frame 140, and a cathode lead terminal 180 which is electrically connected to the lower surface of the cathode lead frame 150.

More specifically, as shown in FIG. 4, the anode wire 12 is inserted and connected to the lower portion of the capacitor element 110 with a positive polarity, and the cathode extraction layer 130 is formed on the capacitor element 110.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 projects, in order to prevent the anode wire 120 and the cathode extraction layer 130 from being electrically connected to each other.

Alternately, the projecting surface of the anode wire 120 may be coated with an insulating material so as to be insulated from the cathode extraction layer 130.

Meanwhile, after the anode wire 120 is inserted and connected to the capacitor element 110, the projecting lower portion of the anode wire 120 can be cut so as to be adjacent to the surface of the capacitor element 110, in order for the miniaturization of the solid electrolytic capacitor 110 or an increase in capacitance.

The projecting lower portion of the anode wire 120 may be cut by ultraviolet (UV) laser.

At this time, before the projecting end of the anode wire 120 is cut, it is preferable to coat the surface of the anode wire 120 with an insulating material.

The coating is performed to prevent LC defects which may occur in the cutting of the anode wire 120.

Next, as shown in FIG. 5, the insulating adhesive 145 is provided on the top surface of the anode lead frame 140 having the insertion portion 140a, and the conductive adhesive 155 is provided on the top surface of the cathode lead frame 150.

Then, as shown in FIG. 6, the anode lead frame 140 is bonded to one side of the lower surface of the capacitor element 110 through the insulating adhesive 145, and the cathode lead frame 150 is bonded to the other side of the lower surface of the capacitor element 110 through the conductive adhesive 155.

That is, the projecting lower portion of the anode wire 120 is inserted into the insertion portion 140a of the anode lead frame 140, and the anode lead frame 140 is pressed against the capacitor element 110 through the insulating adhesive 145 so as to be bonded to the capacitor element 110.

Further, the cathode lead frame 150 is pressed against the capacitor element 110 through the conductive adhesive 155 so as to be bonded to the capacitor element 110.

At this time, the pressing force for bonding the anode and cathode lead frames 140 and 150 to the capacitor element 110 is applied in such a manner that the insulating adhesive 145 and the conductive adhesive 155 have a thickness of 10 to 70 µm.

Further, if necessary, while heat is applied to the anode and cathode lead frames 140 and 150, the insulating adhesive 145 and the conductive adhesive 155 can be semi-cured to accurately adjust the position of the capacitor element 110. Then, the insulating adhesive 145 and the conductive adhesive 155 are completely cured in a sealed oven or through a reflow curing process such that the anode and cathode lead frames 140 and 150 are respectively fixed to the capacitor element 110.

At this time, it is preferable that the insulating adhesive 145 and the conductive adhesive 155 are cured at a temperature of 150 to 170° C. for 40 to 60 minutes.

Next, as shown in FIG. 7, the molding portion 160 is formed to surround the capacitor element 110 such that the anode wire 120, the anode lead frame 140, and the cathode lead frame 150 are sealed.

The molding portion 160 may be formed of epoxy-based resin.

Preferably, the molding portion 160 is cured at a temperature of about 170° C. If necessary, a post curing process may be added, in which the molding portion 160 is cured at a temperature of 160° C. for 30 to 60 minutes.

Next, as shown in FIG. 8, the molding portion 160 is diced along the designed dicing line (dashed line) such that the lower end surface of the anode wire 120, the lower surface of the anode lead frame 140, and the lower surface of the cathode lead frame 150 are exposed. Then, the size of the solid electrolytic capacitor is minimized.

At this time, it is preferable that the diced portion of the molding portion 160 is subjected to grinding, polishing, and sand blasting so as to remove foreign matters.

Finally, as shown in FIG. 9, the anode lead terminal 170 is constructed by forming a plated layer on the exposed lower end surface of the anode wire 110, the lower surface of the anode lead frame 140, and the molding portion 160 adjacent to the anode lead frame 140 through an electroless plating method, and the cathode lead terminal 180 is constructed by forming a plated layer on the lower surface of the cathode lead frame 150 and the molding portion 160 adjacent to the cathode lead frame 150 through the electroless plating method.

Preferably, the plated layer is composed of an inner plated layer obtained through electroless Ni/P plating and an outer plated layer obtained by plating the inner plated layer with Cu or Sn.

Preferably, the inner plated layer is formed to have a thickness of 0.1 to 20 µm. More preferably, the inner plated layer is formed to have a thickness of 0.3 to 3 µm.

Preferably, the outer plated layer is formed to have a thickness of 0.1 to 10 µm.

Figure 10:
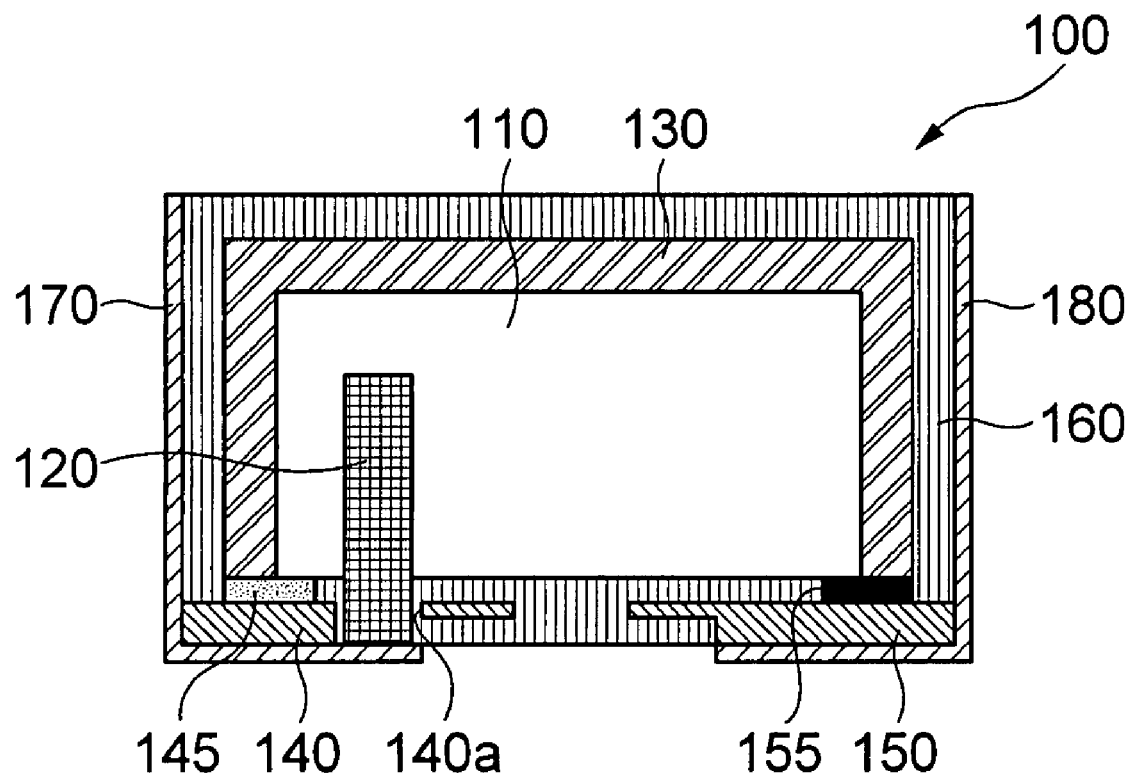
FIG. 10 is a cross-sectional view of a solid electrolytic capacitor according to a modification of the first embodiment of the invention.

FIG. 10 is a cross-sectional view of a solid electrolytic capacitor according to a modification of the first embodiment. As shown in FIG. 10, the anode lead terminal 170 and the cathode lead terminal 180 are not formed in a U shape, but may be formed in an L shape.

Second Embodiment of Solid Electrolytic Capacitor

Figure 11:
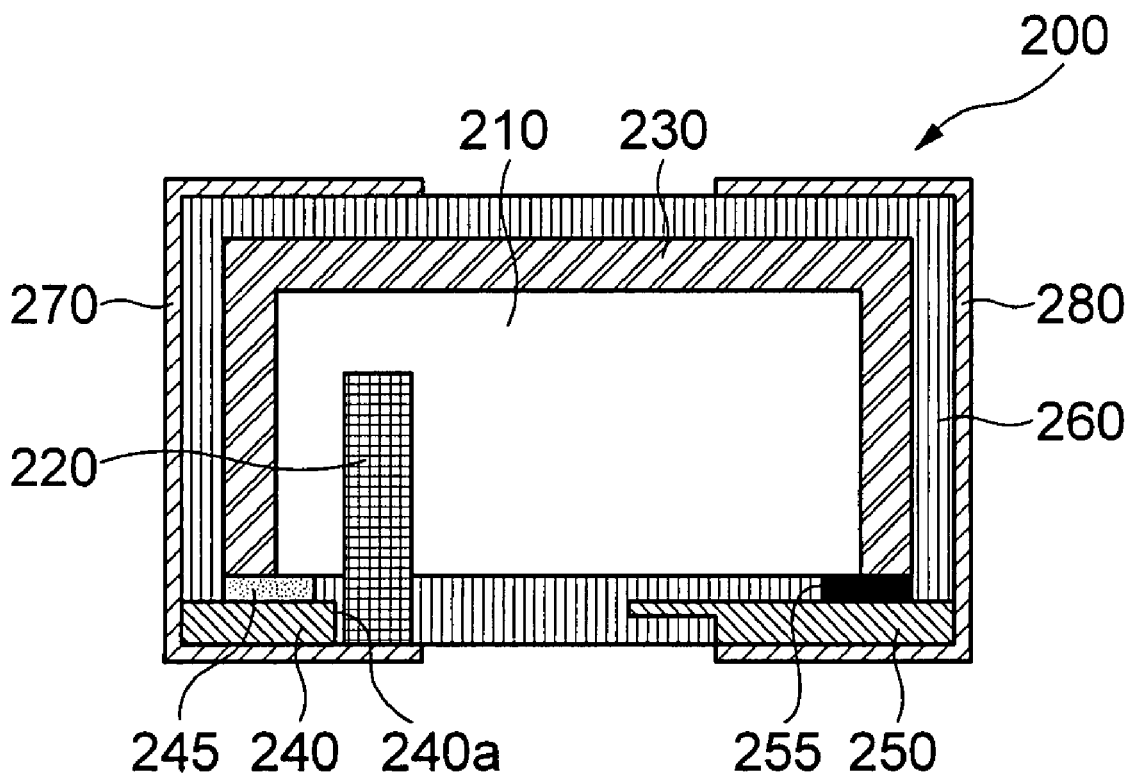
FIG. 11 is a front cross-sectional view of a solid electrolytic capacitor according to a second embodiment of the invention.
Figure 12:
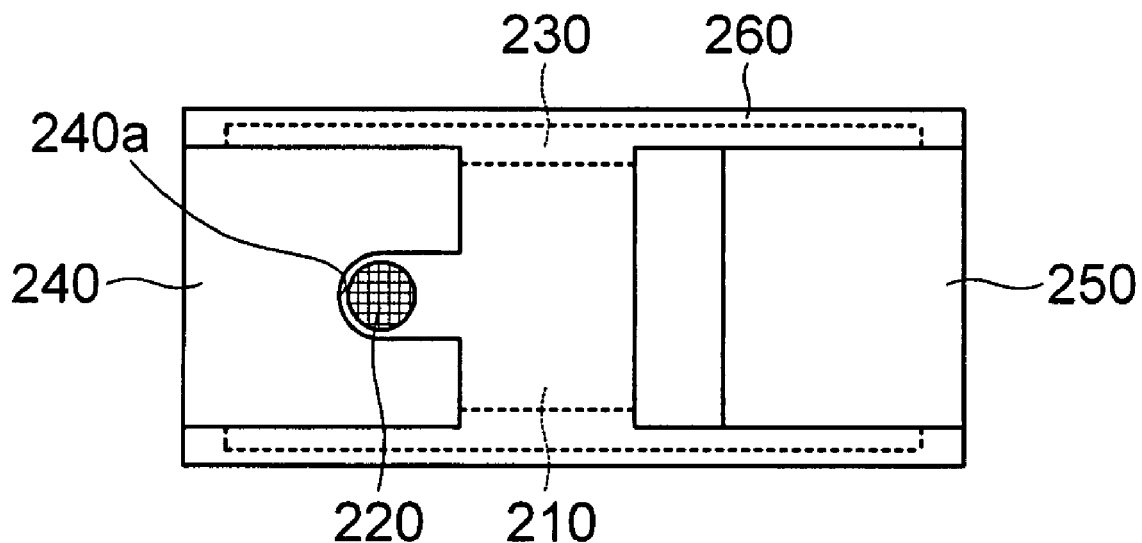
FIG. 12 is a bottom view of the solid electrolytic capacitor of FIG. 11, showing a state where anode and cathode lead terminals are removed.

Referring to FIGS. 11 and 12, a solid electrolytic capacitor according to a second embodiment of the invention will be described in detail.

FIG. 11 is a front cross-sectional view of a solid electrolytic capacitor according to a second embodiment of the invention. FIG. 12 is a bottom view of the solid electrolytic capacitor of FIG. 11, showing a state where anode and cathode lead terminals are removed.

As shown in FIG. 11, the solid electrolytic capacitor 200 according to the second embodiment of the invention includes a capacitor element 210, an anode wire 220, a cathode extraction layer 230, an anode lead frame 240, a cathode lead frame 250, a molding portion 260, an anode lead terminal 270, and a cathode lead terminal 280, similar to the first embodiment.

As shown in FIG. 12, an insertion portion 240a formed in the anode lead frame 240 of the solid electrolytic capacitor 200 according to the second embodiment of the invention has a different shape from the insertion portion 140a (refer to FIG. 3) formed in the anode lead frame 140 of the solid electrolytic capacitor 100 according to the first embodiment of the invention.

That is, the insertion portion 240a formed in the anode lead frame 240 of the solid electrolytic capacitor 200 according to the second embodiment has a groove shape which is opened toward the cathode lead frame 250.

Therefore, as an amount of the molding portion 160 filled in the insertion portion 240a increases, a coupling force is enhanced.

Third Embodiment of Solid Electrolytic Capacitor

Figure 13:
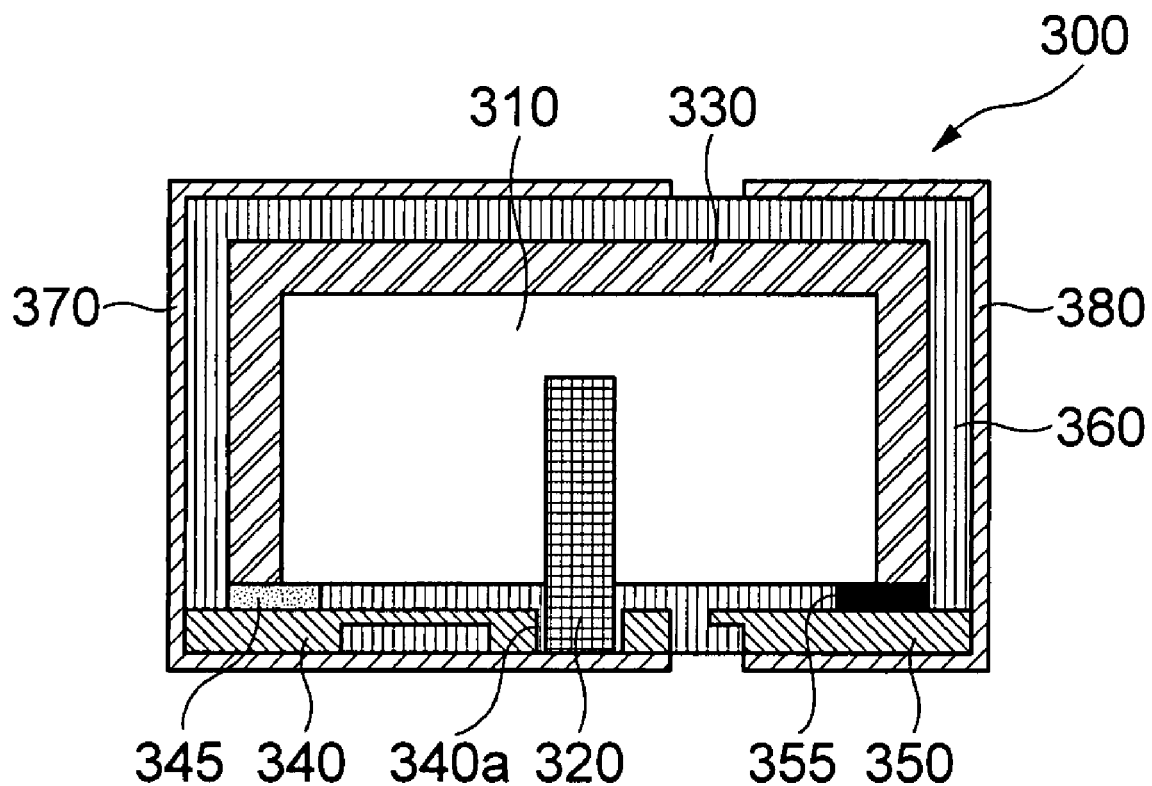
FIG. 13 is a front cross-sectional view of a solid electrolytic capacitor according to a third embodiment of the invention.
Figure 14:
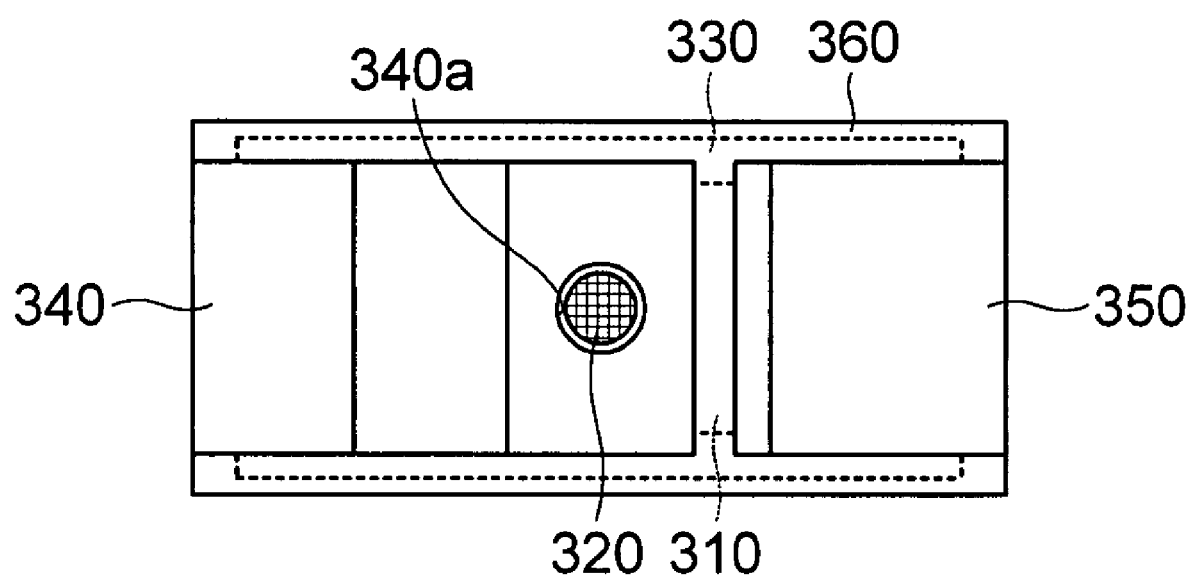
FIG. 14 is a bottom view of the solid electrolytic capacitor of FIG. 13, showing a state where anode and cathode lead terminals are removed.

Referring to FIGS. 13 and 14, a solid electrolytic capacitor according to a third embodiment of the invention will be described in detail.

FIG. 13 is a front cross-sectional view of a solid electrolytic capacitor according to a third embodiment of the invention. FIG. 14 is a bottom view of the solid electrolytic capacitor of FIG. 13, showing a state where anode and cathode lead terminals are removed.

As shown in FIG. 13, the solid electrolytic capacitor 300 according to the third embodiment of the invention includes a capacitor element 310, an anode wire 320, a cathode extraction layer 330, an anode lead frame 340, a cathode lead frame 350, a molding portion 360, an anode lead terminal 370, and a cathode lead terminal 380, similar to the first embodiment.

As shown in FIGS. 13 and 14, the anode wire 320 of the solid electrolytic capacitor 300 is inserted and connected to a lower portion of the capacitor element 310 so as to be positioned in the center of the capacitor element 310.

Accordingly, since the anode wire 320 is positioned in the center of the capacitor element 310, the anode lead frame 340 of the solid electrolytic capacitor 300 according to the third embodiment is formed to be longer than the anode lead frame 140 (refer to FIG. 3) according to the first embodiment.

The insertion portion 340a formed in the anode lead frame 340 according to the third embodiment may have a groove shape which is opened toward the cathode lead frame 350, in addition to the hole shape.

Further, the anode lead frame 340 may have a groove formed on the lower surface thereof. Then, as an amount of the molding portion 160 filled through the groove increases, a coupling force can be enhanced.

According to the present invention, the structure of the solid electrolytic capacitor and the manufacturing process thereof can be simplified to reduce a manufacturing cost. Further, the solid electrolytic capacitor can be reduced in size, and the capacitance can be maximized. Furthermore, a low ESR characteristic can be implemented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A solid electrolytic capacitor comprising:
   a capacitor element with a positive polarity;
   an anode wire inserted and connected to a lower portion of the capacitor element;
   a cathode extraction layer formed on the capacitor element;
   an anode lead frame provided on one side of the lower surface of the capacitor element so as to be electrically insulated from the cathode extraction layer, the anode lead frame having an insertion portion into which a projecting lower portion of the anode wire is inserted;
   a cathode lead frame provided on the other side of the lower surface of the capacitor element so as to be electrically connected to the cathode extraction layer;
   a molding portion formed to surround the capacitor element and exposing the lower end surface of the anode wire, the lower surface of the anode lead frame, and the lower surface of the cathode lead frame;
   an anode lead terminal provided on the molding portion so as to be electrically connected to the lower end surface of the anode wire and the lower surface of the anode lead frame; and
   a cathode lead terminal provided on the molding portion so as to be electrically connected to the lower surface of the cathode lead frame.

2. The solid electrolytic capacitor according to claim 1, wherein the anode lead frame is bonded to the capacitor element through an insulating adhesive, and the cathode lead frame is bonded to the capacitor element through a conductive adhesive.

3. The solid electrolytic capacitor according to claim 2, wherein the anode and cathode lead frames are formed of a conductive material.

4. The solid electrolytic capacitor according to claim 1, wherein the insertion portion of the anode lead frame is formed in a hole shape or a groove shape which is opened toward the cathode lead frame.

5. The solid electrolytic capacitor according to claim 1, wherein the cathode extraction layer is composed of a dielectric oxide coating film, a solid-state electrolyte layer, and a cathode reinforcing layer, which are sequentially formed on the capacitor element.

6. The solid electrolytic capacitor according to claim 1, wherein the anode and cathode lead terminals are formed of a plated layer obtained through an electroless plating method.

7. The solid electrolytic capacitor according to claim 6, wherein the plated layer is composed of an inner plated layer obtained through electroless Ni/P plating and an outer plated layer obtained by plating the inner plated layer with copper (Cu) or tin (Sn).

8. The solid electrolytic capacitor according to claim 1, wherein the anode wire is positioned in the center of the capacitor element.

9. A method of manufacturing a solid electrolytic capacitor, comprising the steps of:
   (a) forming a capacitor element with a positive polarity;
   (b) inserting and connecting an anode wire to a lower portion of the capacitor element;
   (c) forming a cathode extraction layer on the capacitor element;
   (d) inserting a projecting lower portion of the anode wire into an insertion portion of the anode lead frame, providing an anode lead frame on one side of the lower surface of the capacitor element so as to be electrically insulated from the cathode extraction layer, and providing a cathode lead frame on the other side of the lower surface of the capacitor element so as to be electrically connected to the cathode extraction layer;
   (e) forming a molding portion to surround the capacitor element;
   (f) exposing the lower end surface of the anode wire, the lower surface of the anode lead frame, and the lower surface of the cathode lead frame; and
   (g) forming an anode lead terminal, which is electrically connected to the lower end surface of the anode wire and the lower surface of the anode lead frame, and a cathode lead terminal which is electrically connected to the lower surface of the cathode lead frame.

10. The method according to claim 9 further comprising the step of:
    cutting the projecting lower portion of the anode wire such that the lower portion of the anode wire is adjacent to the surface of the capacitor element,
    wherein the cutting of the projecting lower portion is performed after step (b).

11. The method according to claim 10 further comprising the step of:
    coating the surface of the anode wire with an insulating material,
    wherein the coating of the surface is performed before the cutting of the projecting lower portion.

12. The method according to claim 10, wherein the lower portion of the anode wire is cut by ultraviolet (UV) laser.

13. The method according to claim 9, wherein in step (c), the cathode extraction layer is constructed by sequentially forming a dielectric oxide coating film, a solid-state electrolyte layer, and a cathode reinforcing layer on the capacitor element.

14. The method according to claim 9, wherein in step (d), the anode lead frame is bonded to the capacitor element through an insulating adhesive, and the cathode lead frame is bonded to the capacitor element through a conductive adhesive.

15. The method according to claim 14, wherein when the anode or cathode lead frame is pressed against the capacitor element, a bonding position between the capacitor element and the anode or cathode lead frame is adjusted in a state where the insulating adhesive or the conductive adhesive is semi-cured by applying heat to the anode or cathode lead frame, and then the insulating adhesive or the conductive adhesive is completely cured.

16. The method according to claim 9, wherein in step (e), the molding portion is formed to seal the anode wire, the anode lead frame, and the cathode lead frame.

17. The method according to claim 16, wherein the molding portion is formed of epoxy-based resin.

18. The method according to claim 9, wherein in step (f), the molding portion is diced in such a manner that the lower end surface of the anode wire, the lower surface of the anode lead frame, and the lower surface of the cathode lead frame are exposed.

19. The method according to claim 18, wherein the diced portion is subjected to grinding, polishing, or sand blasting.

20. The method according to claim 9, wherein in step (g), the anode lead terminal is constructed by forming a plated layer on the exposed lower end surface of the anode wire, the lower surface of the anode lead frame, and the molding portion adjacent to the anode lead frame through an electroless plating method, and the cathode lead terminal is constructed by forming a plated layer on the lower surface of the cathode lead frame and the molding portion adjacent to the cathode lead frame through an electroless plating method.

21. The method according to claim 20, wherein the plated layer is composed of an inner plated layer obtained through electroless Ni/P plating and an outer plated layer obtained by plating the inner plated layer with Cu or Sn.

* * * * *